US006811736B1

(12) United States Patent
Ohman et al.

(10) Patent No.: US 6,811,736 B1
(45) Date of Patent: Nov. 2, 2004

(54) METHOD OF PRODUCING A PLASTIC PRODUCT AND AN ARRANGEMENT FOR MOULDING PLASTIC PRODUCTS UTILISED THEREFOR

(75) Inventors: Per Ove Ohman, Uppsala (SE); Lars Rune Lundbladh, Taby (SE)

(73) Assignees: Gyros AB, Uppsala (SE); Amic AB, Uppsala (SE)

( * ) Notice: Subject to any disclaimer, the term of this patent is extended or adjusted under 35 U.S.C. 154(b) by 429 days.

(21) Appl. No.: 10/069,407

(22) PCT Filed: Aug. 28, 2000

(86) PCT No.: PCT/SE00/01649

§ 371 (c)(1), (2), (4) Date: Feb. 26, 2002

(87) PCT Pub. No.: WO01/14116

PCT Pub. Date: Mar. 1, 2001

(30) Foreign Application Priority Data

Aug. 26, 1999 (SE) ................................ 9903011

(51) Int. Cl.$^7$ ............................ H05B 6/00; B29C 35/08; B29C 45/18; B28B 3/06; B28B 5/00
(52) U.S. Cl. .................... 264/478; 264/494; 264/297.2; 425/542
(58) Field of Search ................................ 264/478, 494, 264/297.2; 425/542

(56) References Cited

U.S. PATENT DOCUMENTS 4,157,931 A    6/1979  Bricot et al.
5,297,951 A  * 3/1994  Asai ........................... 425/556
5,330,693 A    7/1994  Takada

FOREIGN PATENT DOCUMENTS

| EP | 0 537 953 A2 | 4/1993 |
| EP | 0 540 843 A1 | 5/1993 |
| EP | 0 628 957 A1 | 12/1994 |

OTHER PUBLICATIONS

Philips Electronics N.V. and Sony Corporation, "High density CD an Industrial approach", publication No. ISMB 90–80 Feb. 3, 2001, pp. 76–79.

* cited by examiner

Primary Examiner—Stephen J. Lechert, Jr.
(74) Attorney, Agent, or Firm—Birch, Stewart, Kolasch & Birch, LLP (57) ABSTRACT

A method of producing a plastic product having a microstructured surface (3a), utilizing an arrangement for moulding plastic products. Said arrangement has at least two mould parts (2, 3) movable towards and away from each other, a predetermined volume of a viscous polymerizable plastic material (9) being supplied to a cavity formed between the mould parts, after which polymerization of the plastic material occurs. After said polymerization of the plastic material (9'), the mould parts are caused to move apart from each other thereby allowing removal of a finished plastic product the outer shape of which conforms to the shape of the cavity produced by the mould parts. Said viscous polymerizable plastic material (9) is supplied to the cavity (6) around a hole (10a) pertaining to the finished plastic product, and said viscous plastic material is distributed in a direction from said hole (10a) towards the peripheral edge area of the plastic product.

28 Claims, 8 Drawing Sheets

METHOD OF PRODUCING A PLASTIC PRODUCT AND AN ARRANGEMENT FOR MOULDING PLASTIC PRODUCTS UTILISED THEREFOR

This application is the national phase under 35 U.S.C. §371 of PCT International Application No. PCT/SE00/01649 which has an International filing date of Aug. 28, 2000, which designated the United States of America.

TECHNICAL FIELD

The present invention relates primarily to a method of producing a plastic product having at least one outer surface assigned a microstructure, utilising an arrangement for moulding plastic products.

This arrangement for producing plastic products has at least two mould parts movable towards and away from each other, a predetermined volume or quantity of a viscous polymerisable plastic material being supplied to a first cavity formed between the mould parts.

By the expression "polymerisable plastic materials" is meant a plastic material having a viscosity equivalent to that of water or thinly fluid syrup.

The method in accordance with the invention is designed for use in both die-casting and compression moulding.

In the case of die-casting the mould parts assume a co-operating position in relation to each other and a cavity formed between the mould parts has a shape conforming to an outer shape of the plastic product, viscous plastic material being pressed into the cavity and being permitted to polymerise there.

In the case of compression moulding the mould parts shall be able to assume an almost fully united position in order to allow a predetermined volume or quantity of a viscous polymerisable plastic material to be supplied to a first cavity formed between the mould parts.

The method in accordance with the invention is thus based on the mould parts being subsequently compressed to a fully united position and said viscous plastic material being distributed under a positive pressure within a smaller second cavity corresponding to the shape of the final plastic product, the outer form of which will conform to the internal shape of the second cavity formed by the mould parts.

The defining inner surfaces of the second cavity will thus correspond to the outer defining surfaces for the final product. However, each microstructured surface portion of the final product will have its corresponding microstructured surface portion in the second cavity.

Polymerisation of the viscous plastic material is then performed, with the mould parts in fully united position and, after said polymerisation of the plastic material, the mould parts are caused to move apart from each other to allow removal of a finished plastic product from the second cavity formed by the mould parts.

In this context it should be mentioned that by the expression "polymerisable plastic material" is meant a plastic which is supplied in thinly fluid form to a first cavity formed between the mould parts and which is distributed in its thinly fluid form within a second cavity by the movement of the mould parts towards each other, thereby filling out and penetrating into the surface portions of the microstructure in one or more mould parts, whereafter measures are taken to cure or polymerise the plastic material in the second cavity.

Polymerisation of the plastic material may be carried out by means of various known methods.

For instance an addition curing component may be added to the plastic material used, a so-called two-component system, or a plastic material may be chosen that is cured when subjected to light such as UV (ultraviolet) light, a plastic material curable when subjected to heat, or a plastic material with catalytic properties for polymerising, etc.

Thus the invention is not based primarily on the use of such viscous thermoplastic materials with which a desired curing shall occur by a hot plastic material being introduced under a positive pressure between fully united mould parts forming said second cavity and where the curing occurs by cooling of the mould parts and the inner structure of the second cavity.

The invention relates secondly to an arrangement for producing plastic products, designed to enable performance of the method in accordance with the invention.

Although the invention may be applied in the die-casting technology the significant properties of the invention will be illustrated in the following in the compression moulding technology, utilising a viscous polymerisable plastic material.

BACKGROUND ART

Various methods have been proposed for producing a plastic product with microstructured surface portions, utilising an arrangement for producing plastic products.

Considering the application so significant for the present invention, namely the prime object of providing a method and an arrangement for producing plastic products for the manufacture of plastic discs containing information, such as CD discs, DVD discs or, in a wider application, micromechanical discs of various types, a plurality of methods and arrangements are known.

Microfluids fall within the latter application, where a fluid shall pass through channels in the disc formed by means of micromechanics, for measuring various entities. Open channels in the surface may here be covered by a lid in order to form closed channels in the surface.

A more specific application is to allow winding channels to be formed on a disc in order to separate different DNA molecules with electrophoresis. A voltage forces the molecules forward and an optical detector registers when they arrive.

The microstructure of CD discs and storage of information currently has a height of 0.1 $\mu$m and a breadth (elevation and depression) of 0.7 $\mu$m.

The microstructure useful in microfluids for flow handling and optics may have a height of 10–100 $\mu$m and a channel breadth of 20–100 $\mu$m.

For information storage it is known to produce CD discs with high or extremely high storage capacity.

In this context it should be mentioned that CD discs of the type under discussion have been given various designations for the relevant storage capacity, such as DVD5, DVD8 (Digital Versatile Disc), where the figure stated indicates the storage capacity in Gbyte.

An arrangement for producing plastic products which is currently extremely useful for producing such CD discs is the use of an injection moulding machine for thermoplastics where two mould parts used shall assume a position fully co-operating with each other and where the mould parts form said second cavity.

In this co-operating position a heated thermoplastic compound, in the form of a plastic composite, is pressed through a fixed mould part to a space or a second cavity formed between the two mould parts, for die-casting of a flat plastic component with microstructured surface portions.

The movable mould part is then moved away from the fixed mould part and the formed flat moulded plastic component or the CD disc is removed from the movable mould part.

In this application curing of the thermoplastic material occurs through a considerable drop in temperature, usually in the order of 100° C. The drop in temperature stated here applies to the difference between the temperature of the feeding screw and of the plastic product upon removal from the mould parts.

The ambition to maintain a high rate of manufacture demands a temperature in the mould parts and the second cavity that has a cooling and curing effect on the thermoplastic material supplied, with reduction of the replication ability as regards the microstructured surface section.

However, the present invention is also based on an, albeit, previously known method of producing a plastic product and an arrangement for producing plastic products which, as a result of the thermoplastic-based manufacturing method described has been pushed aside since, with current technology and demands, it has been considered too expensive and too slow. This method with an arrangement for producing plastic products has therefore only be used to a limited extent for producing genuine, complete plastic products with one or more microstructured surfaces.

The method and the arrangement for producing plastic products from which the present invention can be deemed to emanate are shown and described in more detail in the publication "High Density CD and Industrial approach", publication number ISBM 90-80 2001-2-3, particularly pages 77–79.

The method and arrangement for producing plastic products from which the present invention has been developed are described in more detail with reference to the following FIGS. 1 and 2.

The advantage with this method and the associated arrangement for producing plastic products is that the replication capacity is good, thanks to a polymerisation of the plastic material, in that a viscous plastic material can be pressed out into a second space and is only thereafter activated so that polymerisation occurs.

Additional examples of the state of the prior art are shown and described in the following patent publications:
EP-A1-0 628 957

Here is shown and described an arrangement for injection moulding of optical recording blanks comprising two mould parts, moveable towards each other, which are designed and displaceable in order to form a cavity between them, corresponding to the shape of the recording blank.

Referring now to FIG. 6, the arrangement is shown in cross-section and from this figure it can be seen that a polycarbonate-based plastic shall be pressed in a moulding apparatus based on the principle of injection.

The moulding process, for the manufacturing of an optical disc substrate, is based upon that an outer edge (21a) for the movable mould part (21) shall be brought into contact with the upper surface (28a) for the mould support (28) and which is arranged at the periphery of the lateral side part (22) of the cavity in order to close the mould.

In this position, the plastic material is injected from the orifice (27) and the nozzle (13) and into the space (20). During this injection process, the space is opened by the moveable part (21) being displaced from this space according to FIG. 7, and subsequently the parts are pressed together again towards the position shown in FIG. 6, according to FIG. 8.

It should especially be noted that the finished product will here comprise of an entire disc, (the central part of which does not display a hole) the central portion of which however is formed with a thinner area (of the part 24) and to this area is integrally attached a funnel-shaped part, cured by cooling and having the shape of a truncated cone, which must be regarded as a residual product.

The thinner portion and the funnel-shaped part shall be separated through punching, in an operation completely separated from the moulding process, in order to subsequently be able to have a disc-form with a centrally oriented hole.

To continue, it is obvious that the technique shown and described here, is based on die-casting or compression moulding of a plastic material, which is made slightly viscous through heating, and through a reduction of temperature in the mould is allowed to solidify to a disc substrate.
EP-A1-0 540 843

Here is shown and described a process for producing optical discs. It is proposed that onto a substrate (3), made of silicone, quartz, glass or metal, is applied a photoresistant in the shape of a layer (1) and through exposure to light, developing and etching, a punch or stamper (6) is obtained and thereby a duplication may be achieved of an information pattern for an optical disc substrate by using a plastic, curable by means of UV light, a polymerised plastic material which is also used in the present invention.

Account of the Present Invention

Technical Problems

Considering the circumstance that the technical deliberations one skilled in the relevant art must perform in order to be able to offer a solution to one or more technical problems posed are initially an insight into the measures and/or the sequence of measures that must be taken and a choice of the means required, and on the basis thereof, the subsequent technical problems should be relevant in arriving at the present invention.

Considering the earlier state of the art as described above, and utilising a method described more fully in the preamble to claim 1, and also an arrangement for producing plastic products described more fully in the preamble to claim 15, it should be deemed a technical problem to make use of the principles for the, methods and the arrangement for producing plastic products described more fully in the above-mentioned publications, in order rationally, at lower cost and observing higher precision, to be able to create such conditions that a plastic product can be produced having microstructure-related surface portions of various types.

A technical problem exists, using simple measures, in being able to create such conditions that a viscous polymerisable plastic material can be supplied in a ring-shape to a cavity, such as around a hole pertaining to the finished plastic product, and that said viscous plastic material is distributed in a radial direction from said hole towards the peripheral edge area or areas of the plastic product.

A technical problem also exists, using simple measures, in being able to create conditions for producing a plastic product with surface portions assigned a microstructure where the microstructure can be chosen fine for storing information and/or coarse for other technical applications, such as microfluids.

It should furthermore be considered a technical problem, using simple measures, to be able to create such conditions that the plastic product can be produced by die-casting or compression moulding.

A technical problem is also entailed in an application of this type, in being able to realise the significance of and advantages associated with being able to attach a substrate to one mould part, to which substrate the thin polymerisable plastic material shall adhere during the polymerisation.

A technical problem is also entailed in being able to realise the significance of and advantages associated with one of the substrate's or the insert's surfaces defining the cavity having a microstructure or alternatively being covered by a layer.

A technical problem is also entailed in being able to realise the significance of and advantages associated with one cavity-defining surface or an insert related thereto of a second mould part having a microstructure.

A technical problem is also entailed in being able to realise the significance of allowing said second cavity to have the shape and thickness of a CD disc, or thinner, or the like, said second cavity being defined by the insert by an outer concentric circular ring around the peripheral edge area.

A technical problem is also entailed in being able to realise the significance of and advantages associated with said substrate or insert forming an outer, annular ridge, the latter provided with narrow grooves.

A technical problem is also entailed in being able to realise the significance of and advantages associated with letting said outer ring delimit the distribution of the plastic material before polymerisation by means of measures entailing curing by means of light or the like.

A technical problem is also entailed in being able to realise the significance of said viscous plastic material being supplied to said cavity under positive pressure and by a circular valve arrangement.

A technical problem is also entailed in being able to realise the significance of and advantages associated with said first and second cavities being placed under negative pressure until the mould parts have been moved to said fully united position.

It would appear to be a technical problem, using simple measures, to be able to create such conditions that said cavity is placed under negative pressure, at least while the viscous plastic material is being injected.

Solution

In order to solve one or more of the technical problems listed above, the present invention commences from a method of producing a plastic product having at least one microstructured surface or surface portion, utilising an arrangement for producing plastic products.

This arrangement shall be provided with at least two mould parts movable towards and away from each other, a predetermined volume of a viscous polymerisable plastic material being supplied to a cavity formed between the mould parts and that, after said polymerisation of the plastic material, the mould parts are caused to move apart from each other to allow removal of a finished plastic product the outer shape of which conforms to the inner shape of a cavity produced by the mould parts.

The invention specifies that said viscous polymerisable plastic material shall be supplied to a cavity around a hole pertaining to the finished plastic product, and that said viscous plastic material shall, through the displacement movement of the mould parts towards each other or similar, be distributed in a direction from said hole towards the peripheral edge area of the plastic product.

Suggested embodiments falling within the scope of the present invention include that, if the plastic product is produced by means of die-casting, when said mould parts assume a fully united position the viscous polymerisable plastic material is pressed in within a central area of the finished plastic product and in proximity to a hole allocated to the plastic product.

If the plastic product is produced by means of compression moulding, in an almost fully united position of the mould parts and a first cavity thus formed between the mould parts, a predetermined volume of a viscous polymerisable plastic material is supplied to said first cavity, after which the mould parts are pressed together to a fully united position in order to distribute said plastic material within a second cavity the inner shape of which corresponds to the outer shape of the final plastic product, whereafter polymerisation of the plastic material occurs with the mould parts in a fully united position, then said viscous polymerisable plastic material shall be supplied to the first cavity within the central area of the finished plastic product and in proximity to a hole allocated to the plastic product.

Furthermore, it is proposed that, upon movement of the mould parts towards a fully united position, said viscous plastic material shall be distributed within the cavity in a direction from said hole and towards the peripheral edge area of the plastic product.

When producing a symmetrical disc the plastic material shall be supplied around a centrally located hole and the plastic material shall spread in radial direction.

Suggested embodiments failing within the scope of the present invention also include that an insert or a substrate may be attached to at least one of the mould parts, to which insert or substrate the polymerisable plastic material shall adheres after polymerisation.

Also proposed is that one of the substrate's surfaces defining the cavity may have a microstructure, preferably covered by a semi-reflecting layer.

Also proposed is for one cavity-defining surface (or insert) of a second mould part to be partially or entirely microstructured.

The invention also proposes that said second cavity be defined by an outer circular ring formed in an insert or in a substrate around a peripheral edge area before measures are taken to polymerise a plastic material enclosed in the second cavity.

Also proposed is for said substrate to be provided with an outer, annular ridge, the latter provided with narrow groves.

Said outer circular ring may also be formed by means of surface determined measures for curing by means of light or the like.

Said viscous plastic material shall be supplied to said first cavity under positive pressure and via a circular valve arrangement.

Said first cavity shall preferably be placed under negative pressure until and when the mould parts have been moved to said fully united position.

Advantages

The advantages that can be primarily considered significant for a method and an arrangement for producing plastic products in accordance with the invention are that conditions are thus created allowing a plastic material to be used which is not cured by adjusted temperature drops, to produce either discs with a fine microstructure and high storage capacity or discs with a coarse microstructure suitable for other applications in the microstructure field, such as microfluids.

The invention enables the use of a viscous plastic material with low temperature which gives good replication capability and where curing or polymerisation occurs through measures other than drops in temperature, such as by being subjected to the influence of light, e.g. UV light.

The present invention also enables the manufacture of discs for storing information, having high storage capacity, by offering at least two reflecting layers of microstructures where a first information surface must be semi-reflecting with a reflection factor of between 20 and 40%.

The principal features of a method in accordance with the present invention are defined in the characterizing part of the appended claim 1 and the principal features of an arrangement for producing plastic products in accordance with the invention are defined in the characterizing part of the appended claim 15.

BRIEF DESCRIPTION OF THE DRAWINGS

The previous state of the art and a presently proposed arrangement for producing plastic products, illustrating the significant features necessary for performance of the method in accordance with the invention will now be described in more detail with reference to the accompanying drawings, in which.

DESCRIPTION OF THE STATE OF THE ART

Figure 1:
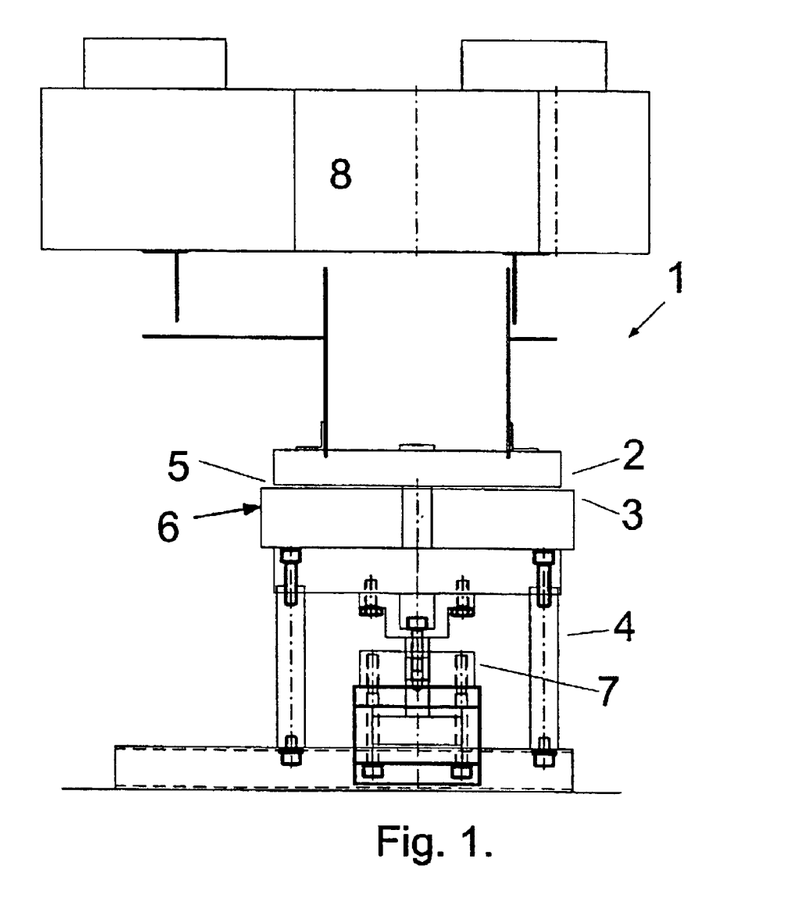
FIG. 1 shows a side view and generally an arrangement for producing plastic products, of a type known per se.
Figure 2:
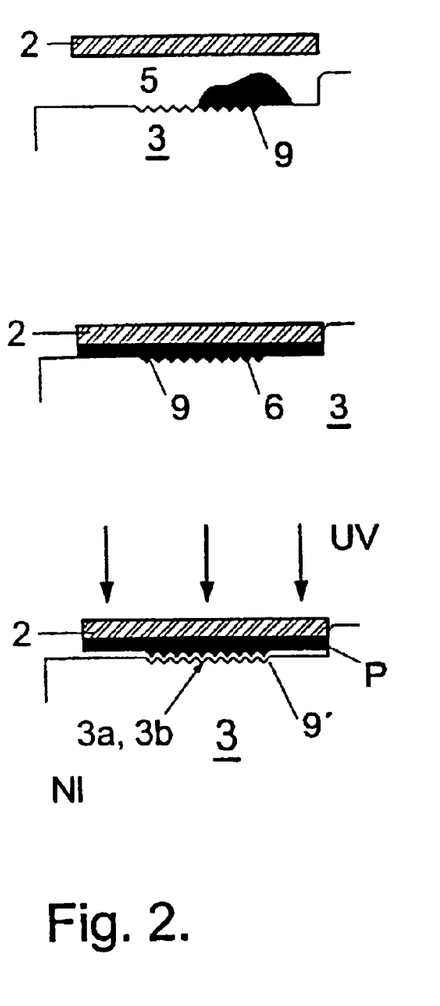
FIG. 2 shows various sequences of the production of a plastic product by means of compression moulding in the arrangement shown in FIG. 1.

FIGS. 1 and 2 show schematically an arrangement for producing plastic products where the plastic product P formed has at least one surface with a microstructure.

The arrangement for producing plastic products has been designated 1.

The arrangement 1 is provided with at least two mould parts, an upper mould part 2 and a lower mould part 3, which are movable towards and away from each other with the aid of a first means 4.

The arrangement 1 is designed to be able to produce a plastic product with a microstructured outer surface, said arrangement having at least two mould parts movable in relation to each other, a cavity formed between the mould parts being supplied with a predetermined volume of a viscous polymerisable plastic material.

After a polymerisation of the plastic material the mould parts are moved apart in order to allow removal of a finished plastic product, the outer shape of which conforms to the inner shape of the cavity formed by the mould parts.

The arrangement 1 can be used for die-casting or compression moulding and the latter application will be described in more detail.

In almost fully united position of these two mould parts 2, 3 a first cavity is formed between the mould parts, and a predetermined volume of a viscous polymerisable plastic material 9 is supplied to said first cavity 5. This is achieved by means of second means 7.

The mould parts 2 and 3 are pressed together by said first means 4 to a fully united position and, under positive pressure, said viscous plastic material 9 is distributed within a smaller second cavity 6.

The second cavity 6 corresponds to the shape of the final plastic product which, in the present application, consists of a disc such as a CD disc having one or more surfaces or surface portions provided with microstructure.

Polymerisation of the plastic material in the second cavity 6 occurs with the mould parts 2, 3 in fully united position, with the aid of a third means 8 in the form of a light-generating unit, such as a UV light generating unit.

After said polymerisation of the plastic material by subjection to the influence of light, the mould parts are caused by said first means 4 to move apart from each other, thereby allowing removal of a finished polymerised plastic product from the second cavity 6 formed by the mould parts.

FIG. 2 illustrates in sequence the method of producing a plastic product with a microstructured surface according to the known method.

Description of a Proposed Embodiment

The invention now specifically states that said viscous polymerisable plastic material shall be supplied to the cavity around a hole pertaining to the finished plastic product, and that said viscous plastic material is distributed in a direction from said hole and towards the peripheral edge area of the plastic product.

It is also specified that when production of the plastic product is performed by means of die-casting said mould parts should assume, a fully united position. In this position the viscous polymerisable plastic material is pressed into the central area for the finished plastic product in proximity of a hole pertaining to the finished plastic product.

When the plastic product is produced by means of compression moulding wherein, in almost fully united position of the mould parts a first cavity 5 is formed between the mould parts, a predetermined volume of a viscous polymerisable plastic material 9 is introduced to said first cavity, after which the mould parts are pressed together to a fully united position in order to distribute said plastic material 9 within a small, second cavity 6, the inner shape of which corresponds to the outer shape of the final plastic product, whereafter polymerisation of the plastic material occurs with the mould parts in fully united position, said viscous polymerisable plastic material shall be supplied to the first cavity within the central area of the finished plastic product and in proximity to a hole allocated to the plastic product.

Said viscous plastic material is distributed within the reduced volume of the cavity in a direction from said hole towards the peripheral edge area of the plastic product when the mould parts are moved towards a fully united position.

For production of a symmetrical disc it is proposed that the plastic material be supplied around a centrally placed hole and that the plastic material spreads in radial direction.

Figure 3:
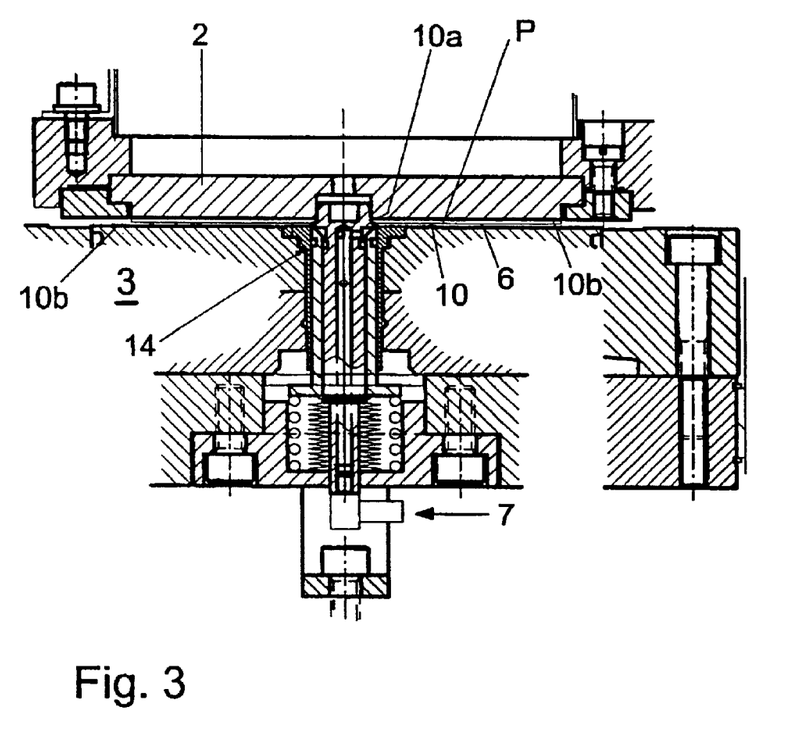
FIG. 3 shows on a larger scale than in FIG. 1, an assembly and co-operation between two used mould parts, in accordance with the invention.

FIG. 3 shows in side view and in section, two mould parts 2, 3 in the arrangement 1 for producing plastic products, these parts being shown in fully united position, thereby revealing the second cavity 6 which corresponds to the shape of the finished disc-shaped plastic product P.

Figure 7:
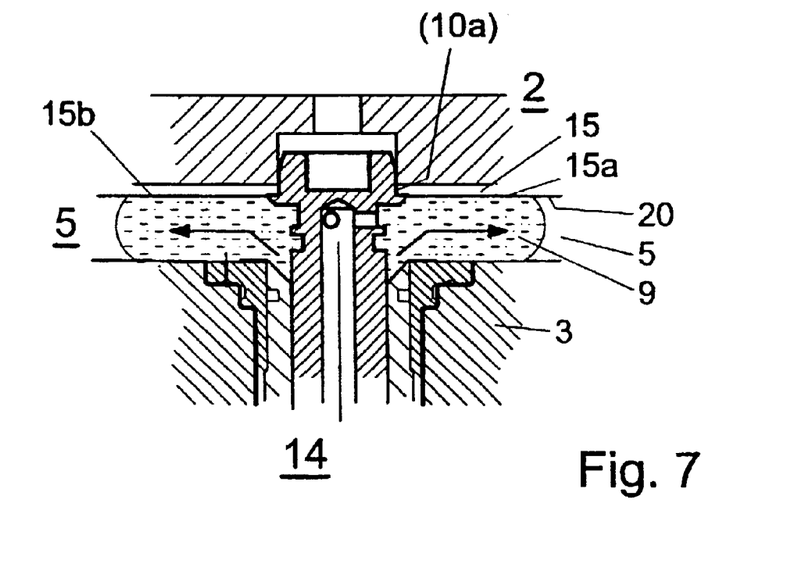
FIG. 7 shows the valve arrangement in an open position to enable a predetermined volume of a viscous polymerisable plastic material to be pressed into a first space formed when the mould parts assume an almost fully united position to produce a first cavity.

FIG. 7 shows a side view of the relative position between the mould parts 2, 3 upon the formation of said first cavity 5 therebetween.

Said viscous polymerisable material 9 shall be supplied via a second means 7 to the first cavity 5 around a centrally placed hole 10a, pertaining to the plastic product, in a produced multilayered disc 10.

When the mould parts 2, 3 are moved by said first means 4 towards a fully united position, said viscous plastic material 9 shall be caused to spread uniformly radially from said hole 10a towards the peripheral edge area 10b of the plastic product P.

Figure 4:
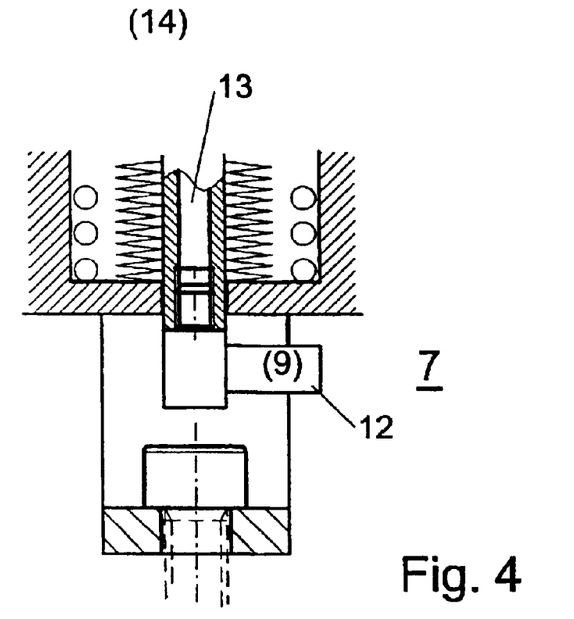
FIG. 4 shows on an enlarged scale a lower part for the assembly shown in FIG. 3.
Figure 6:
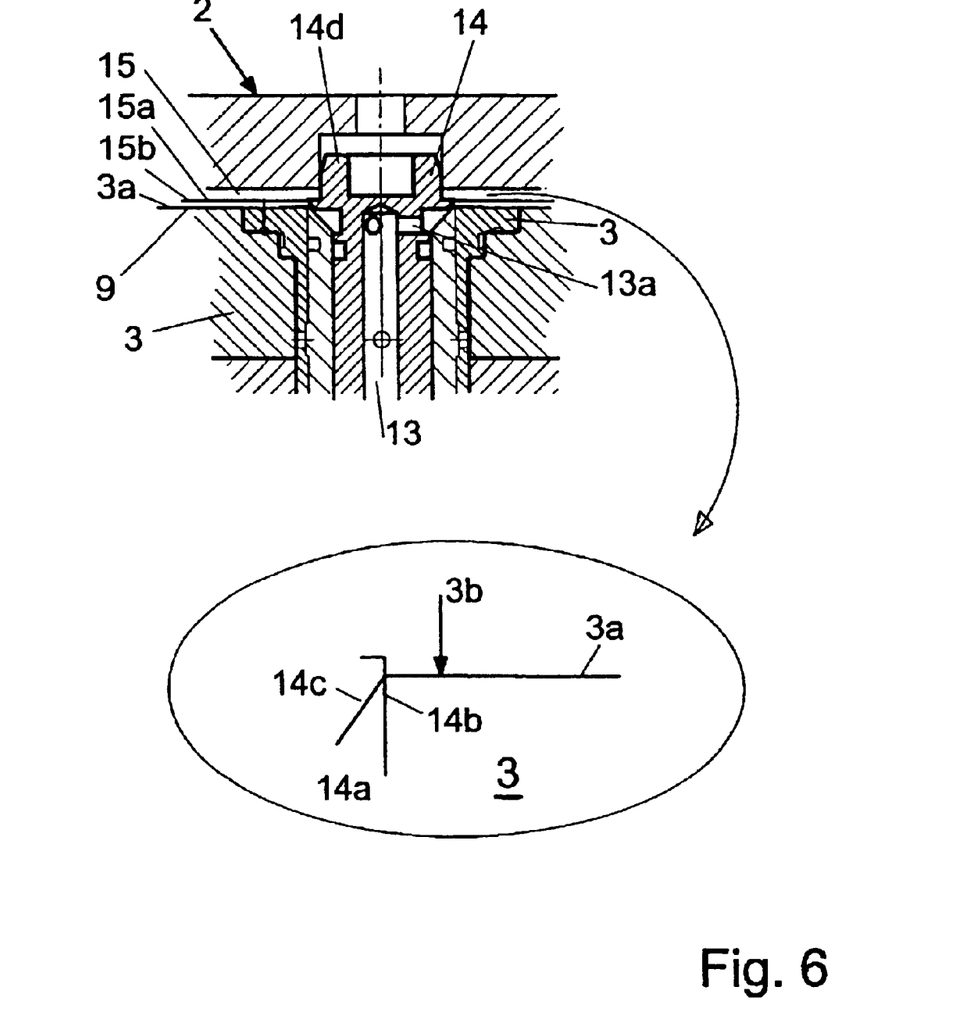
FIG. 6 shows, on a somewhat larger scale than in FIG. 3, a valve arrangement significant to the invention, for pressing out a viscous polymerisable plastic material, FIG. 6 showing the valve in a closed position and the mould parts in fully united position.
Figure 8:
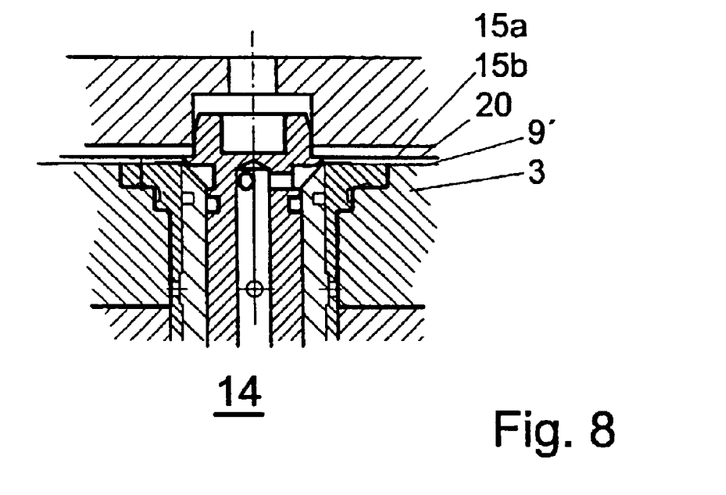
FIG. 8 shows the mould parts in a fully united position and with the predetermined volume distributed within a second cavity and along the whole disc produced.

FIG. 4 shows how the second means 7, in the form of a pump and a volume- or pressure-regulating circuit, feeds viscous polymerisable plastic material (9) through a connection 12 and a tube 13 up to a valve 14 (shown in more detail in FIGS. 6, 7 and 8).

Figure 5:
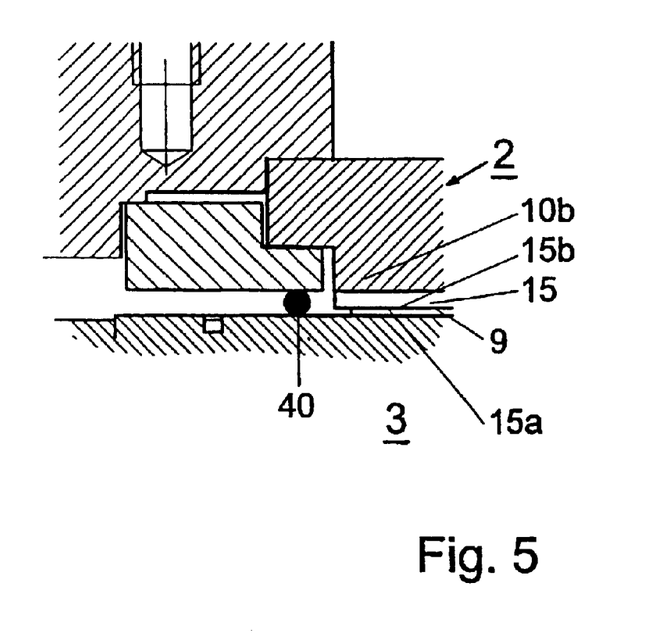
FIG. 5 shows on an enlarged scale co-operation significant to the invention between two mould parts at the peripheral edge part of a produced disc.

FIG. 5 shows the left-hand peripheral edge area 10b in FIG. 3 on a somewhat enlarged scale, from which it is clear that a viscous polymerisable plastic material 9 has been pressed out towards the edge of a flat substrate 15, manufactured previously and serving as an insert or a carrier, after the plastic material 9 has been polymerised to a hard disc 9'.

The disc 10 may thus (according to FIG. 11) consist of a inserted substrate 15 with a surface 15a having a microstructure 15b, a semi-transparent or semi-reflecting thin layer 20, and a polymerised cured disc 9' produced through plastic moulding and having a microstructure 9a' and a reflecting layer 9b', produced in a separate station.

Figure 11:
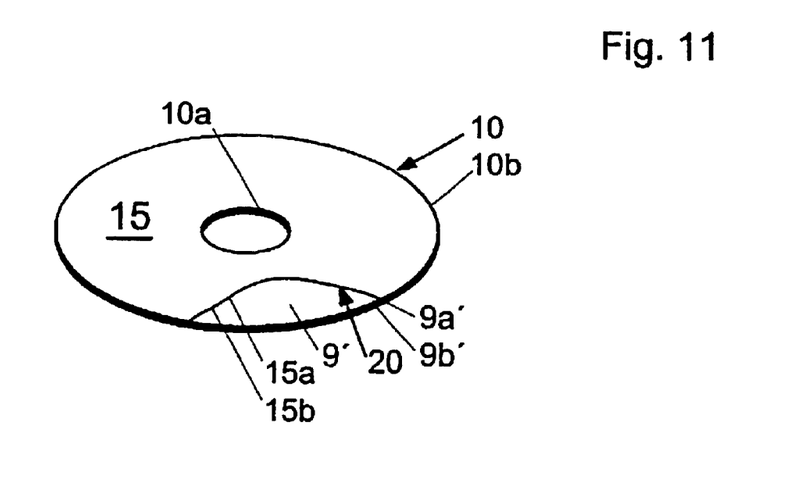
FIG. 11 shows in perspective a disc produced in accordance with the invention.

The transparent substrate 15 with the semi-reflecting layer 20 shall now, as an insert, be coated with a polymerisable hard transparent disc 9', with a microstructure 9a' formed by the second mould part.

FIG. 6 shows in side view and in section an embodiment of a valve arrangement 14.

This shows how a central channel 13 communicates with a space 14a via one or more radially directed channels, one of which has been designated 13a.

FIG. 6 shows, in an enlarged detail, that the space 14a is sealed against an edge 14b and the outer, surface of a cone 14c having the shape of a cylinder and a truncated cone.

FIG. 6 also illustrates that the preformed substrate 15 made of plastic and having a microstructured surface 15a adhering to one mould part 2, against which substrate 15 and a layer 20 covering the surface 15a the polymerisable plastic material 9 is intended to adhere upon polymerisation to a hard disc 9'.

One cavity-defining surface 15a of the substrate 15 may be smooth but in the embodiment shown by way of example in FIG. 6 this surface 15a is shown as having a microstructure 15b.

The cavity-defining surface 3a of the other mould part 3 is intended to have a microstructure 3b.

Although the drawings here show that the microstructure 3b is formed directly on the surface 3a of the second mould part 3, there is nothing to prevent an insert or a substrate corresponding to the substrate 15 from being applied on this surface 3a, the substrate being adhered against the surface 3a to the second mould part 3.

As previously mentioned said second cavity 6, in the shape of a CD-disc, is designed to be defined by a pin 14d inserted through the hole 10a, and an outer circular ring oriented at a peripheral edge area 10b, before measures are taken via a third means 8 for polymerisation of an enclosed plastic material.

Figure 9:
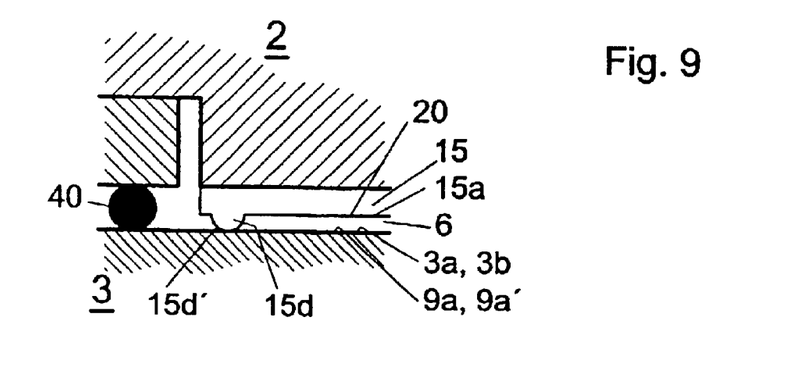
FIG. 9 shows on a somewhat enlarged scale the edge area of a substrate or an insert, provided with an outer annular ridge and a seal offering a negative pressure in the first and second cavities.

An outer, annular ridge 15d provided with a plurality of outwardly directed grooves 15d' is applied on said substrate 15.

Said grooves 15d' may advantageously be radially oriented, but may also be arranged obliquely or in the shape of a labyrinth.

FIG. 9 shows that the ridge 15d shall seal against the surface 3a and that, if the second cavity 6 is filled irregularly from the hole 10a, the plastic material 9 shall be prevented from flowing further. A number of grooves 15d' in the ridge 15d increases the resistance of the plastic material against flowing out, in favour of an easier flow-path via other channels.

The size and number of the grooves 15d' is a question of dimensioning, based on the relevant application and plastic material selected.

Figure 10:
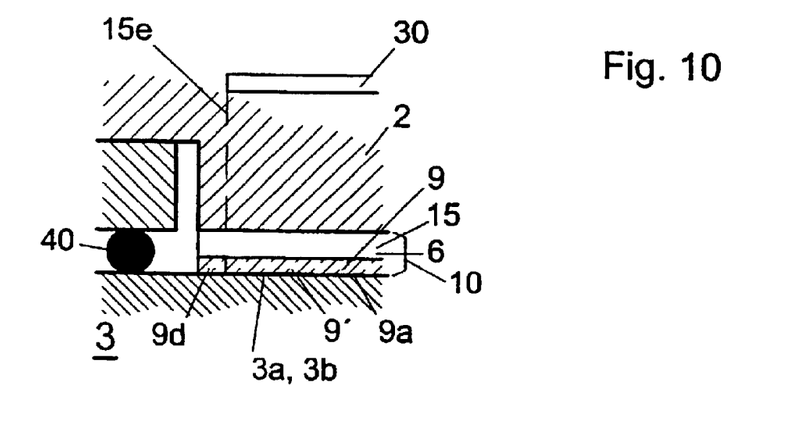
FIG. 10 shows the possibility of forming an outer circular ring with the aid of light-curing measures.

FIG. 10 shows that an outer circular ring 9d may be formed by means of light-curing measures or the like.

FIG. 10 shows that a mask 30 is placed centrally over the substrate 15 and, via a line 15e, shadows a considerable part of the plastic material 9 of the disc 10 but illuminates a circular ring-shaped part 9d, before the material 9 of the disc 10 is polymerised to 9'.

When the plastic material 9 is pressed out to the part 9d, it is polymerised and forms a constriction or ridge that prevents further passage of plastic material 9 with a distribution of the plastic material 9 within the second cavity 6.

The mask 30 can then be removed so that the rest of the plastic material 9 can be subjected to polymerisation to a hard disc 9'.

Said viscous plastic material 9 is intended to be able to be supplied via second means 7 to said first cavity 5 under suitable positive pressure and via a circular valve arrangement 14.

Said first cavity is placed under negative pressure by a fourth means during the time while the mould parts are being moved to said fully united position.

FIG. 9 illustrates how cavities 5 and 6, respectively, are sealed by a sealing ring 40 when a negative pressure prevails.

FIG. 11 shows in perspective a disc 10 produced in accordance with the present invention, from a substrate 15 with a downwardly facing surface 15a assigned a microstructure 15b, and covered by a semi-reflecting layer 20.

This microstructure 15a is now reproduced in mirror-inversion on a surface of the polymerised layer 9', which has a microstructure 9a' on its surface 9a corresponding to microstructures for the surface 3a.

The surface 9a belonging to the microstructure 9a' may advantageously be covered with a reflecting layer 9b'.

Figure 12:
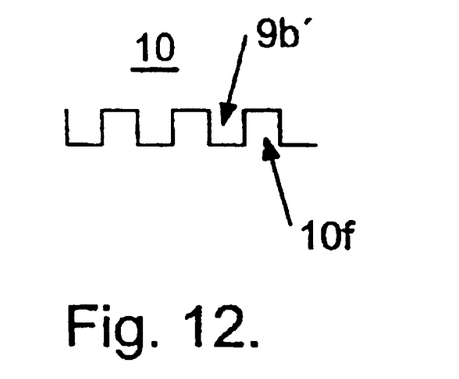
FIG. 12 shows a section through a fine microstructure for a disc carrying information, such as a CD disc.

In accordance with the invention and FIG. 12, the disc 10 can be given a fine micro-structure 10f with the layer 9b', thereby making the disc 10 suitable for storing information, such as a CD-disc in accordance with FIG. 11.

Figure 13:
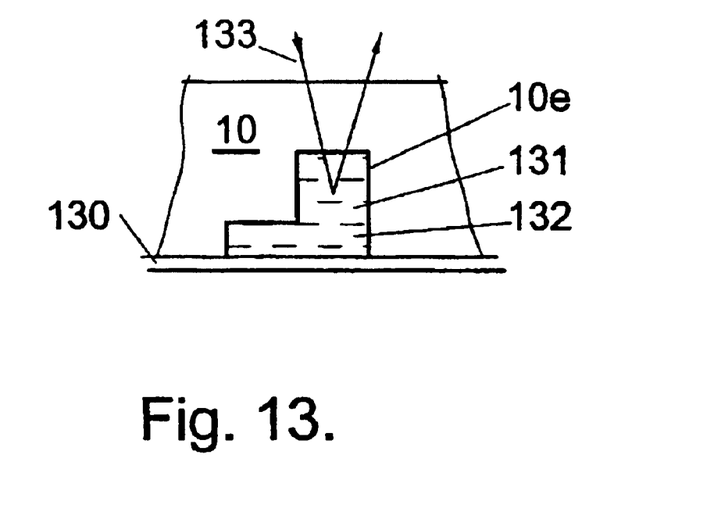
FIG. 13 shows a section through a disc provided with coarse microstructure suitable for microfluids.

In accordance with the invention the disc 10 can be given a coarse, channelled microstructure 10e. FIG. 13 illustrates an application in which the disc 10 rests on a carrier 130 and seals a channel 131.

A fluid 132 flows through channels 131 and the fluid 132 can be analysed via laser beams 133 or the like through the disc 10.

The invention is naturally not limited to the embodiment described above by way of example. Modifications are possible within the scope of the inventive concept illustrated in the appended claims.

What is claimed is:

1. A method of producing a plastic product having a microstructured outer surface, utilising an arrangement for moulding plastic products, said arrangement having at least two mould parts movable towards and away from each other, a predetermined volume of a viscous polymerisable plastic material being supplied to a cavity formed between the mould parts, after which polymerisation of the plastic material occurs and, after said polymerisation of the plastic material, the mould parts being caused to move apart from each other to allow removal of a finished plastic product the outer shape of which conforms to the inner shape of the cavity produced by the mould parts, characterized in that said viscous polymerisable plastic material is supplied to the cavity around a hole pertaining to the finished plastic product, and in that said viscous plastic material shall be distributed in a direction from said hole towards the peripheral edge area of the plastic product.

2. A method as claimed in claim 1 wherein the plastic product is produced by means of die-casting, characterized in that when said mould parts assume a fully united position the viscous polymerisable plastic material is pressed in within a central area of the finished plastic product and in proximity to a hole allocated to the plastic product.

3. A method as claimed in claim 1 wherein the plastic product is produced by means of compression moulding where, in an almost fully united position of the mould parts and a first cavity thus formed between the mould parts, a predetermined volume of a viscous polymerisable plastic material is supplied to said first cavity, after which the mould parts are compressed to a fully united position in order to distribute said plastic material within a smaller second cavity, the inner shape of which corresponds to the outer shape of the final plastic product, whereafter polymerisation of the plastic material occurs with the mould parts in a fully united position, characterized in that said viscous polymerisable plastic material is supplied to the first cavity within the central area of the finished plastic product and in proximity to a hole allocated to the plastic product.

4. A method as claimed in claim 3, characterized in that upon movement of the mould parts towards a fully united position, said viscous plastic material is distributed within the cavity in a direction from said hole and towards the peripheral edge area of the plastic product.

5. A method as claimed in claim 1 for producing a symmetrical disc, characterized in that the plastic material is supplied around a centrally located hole and in that the plastic material spreads in radial direction.

6. A method as claimed in claim 1, characterized in that a substrate is attached as an insert to one of the mould parts, to which substrate the polymerisable plastic material adheres.

7. A method as claimed in claim 1 or claim 6, characterized in that one of the substrate's surfaces defining the cavity has a microstructure, covered by a semi-reflecting layer.

8. A method as claimed in claim 1, characterized in that one cavity-defining insert or surface of a second mould part has a microstructure.

9. A method as claimed in claim 3, characterized in that said second cavity with an inner shape conforming to an outer shape of a disc or the like, is defined by an outer circular ring oriented at a peripheral edge area before measures are taken to polymerise a plastic material enclosed.

10. A method as claimed in claim 6, characterized in that said substrate is provided with an outer, annular ridge provided with narrow grooves.

11. A method as claimed in claim 9, characterized in that said outer ring is formed by means of light-curing measures or the like.

12. A method as claimed in claim 1 or claim 3, characterized in that said viscous plastic material is supplied to the cavity under pressure and via a circular valve arrangement.

13. A method as claimed in claim 3, characterized in that said first and second cavities are placed under a negative pressure until the mould parts have been moved to said fully united position.

14. A method as claimed in claim 1 or claim 2, characterized in that said cavity is placed under a negative pressure while the viscous plastic material is being injected.

15. An arrangement for moulding plastic products in which the plastic product produced has at least one surface with a microstructure, said arrangement having at least two mould parts movable towards and away from each other by a first means, a predetermined volume of a viscous polymerisable plastic material being supplied to a cavity formed between the mould parts, after which polymerisation of the plastic material occurs and, after said polymerisation of the plastic material, the mould parts being caused by said means to move apart from each other thereby allowing removal of a finished plastic product, the outer shape of which conforms to the inner shape of the cavity produced by the mould parts, characterized in that said viscous polymerisable plastic material, via a second means, can be supplied to the cavity around a hole allocated to the finished plastic product and in that said viscous plastic material is caused to be distributed in a direction from said hole towards the peripheral edge area of the plastic product.

16. An arrangement as claimed in claim 15 where the plastic product is produced by means of die-casting, characterized in that when said mould parts are caused by said first means to assume a fully united position, the viscous polymerisable plastic material is injected within the central area for the finished plastic product and in proximity to a hole allocated to the plastic product.

17. An arrangement as claimed in 15 where the plastic product is produced by means of compression moulding wherein, in almost fully united position of the mould parts by means of said first means and a first cavity formed between the mould parts, a predetermined volume of a viscous polymerisable plastic material is introduced to said first cavity, after which said mould parts are pressed together by said first means to a fully united position in order to distribute said plastic material within a small, second cavity, the inner shape of which corresponds to the outer shape of the final plastic product, whereafter polymerisation of the plastic material occurs with the mould parts in fully united position, characterized in that said viscous polymerisable plastic material is arranged to be supplied to the first cavity within the central area of the finished plastic product and in proximity to a hole allocated to the plastic product.

18. An arrangement as claimed in claim 17, characterized in that said viscous plastic material is arranged to be distributed within the cavity in a direction from said hole towards the peripheral edge area of the plastic product when the mould parts are moved towards a fully united position.

19. An arrangement as claimed in claim 15 for producing a symmetrical disc, characterized in that the plastic material is supplied to a centrally placed hole and that the plastic material spreads in radial direction.

20. An arrangement as claimed in claim 15, characterized in that a substrate of plastic is attached to one of the mould parts, to which substrate the polymerisable plastic material is designed to adhere.

21. An arrangement as claimed in claim 15 or claim 20, characterized in that one cavity-defining surface of the substrate is provided with a microstructure, covered by a semi-reflecting layer.

22. An arrangement as claimed in claim 15, characterized in that one cavity-defining surface of a second mould part has a microstructure.

23. An arrangement as claimed in claim 15, characterized in that said second cavity with an inner shape conforming to the outer shape of a disc or the like, is designed to be defined by an outer circular ring oriented at the peripheral edge area before measures are taken, via a third means, for polymerisation of a plastic material enclosed.

24. An arrangement as claimed in claim 15, characterized in that to said substrate or insert is applied an outer, annular ridge, the latter being provided with a plurality of narrow grooves.

25. An arrangement as claimed in claim 23, characterized in that said outer circular ring is designed to be formed by means of light-curing measures or the like.

26. An arrangement as claimed in claim 15, characterized in that said viscous plastic material is designed, via second means, to be supplied to said cavity under a suitable positive pressure and via a circular valve arrangement.

27. An arrangement as claimed in claim 17, characterized in that said first and second cavities are, by means of a fourth means, placed under a negative pressure until the mould parts have been moved to said fully united position.

28. An arrangement as claimed in claim 15 or claim 16, characterized in that said cavity is placed under a negative pressure while the viscous plastic material is being injected.

* * * * *